United States Patent
Guggenberger et al.

(10) Patent No.: US 8,429,912 B2
(45) Date of Patent: Apr. 30, 2013

(54) DUAL TURBOCHARGED INTERNAL COMBUSTION ENGINE SYSTEM WITH COMPRESSOR AND TURBINE BYPASSES

(75) Inventors: Thomas Guggenberger, Buch bei Jenbach (AT); Markus Haidn, Maurach (AT); Johann Klausner, St. Jakob i.H. (AT)

(73) Assignee: GE Jenbacher GmbH & Co OHG, Jenbach (AT)

( * ) Notice: Subject to any disclaimer, the term of this patent is extended or adjusted under 35 U.S.C. 154(b) by 0 days.

(21) Appl. No.: 13/169,304

(22) Filed: Jun. 27, 2011

(65) Prior Publication Data

US 2011/0253112 A1 Oct. 20, 2011

Related U.S. Application Data (63) Continuation of application No. PCT/AT2010/000033, filed on Feb. 2, 2010.

(30) Foreign Application Priority Data

Feb. 3, 2009 (AT) .................................. A 182/2009

(51) Int. Cl.
 *F02B 33/44* (2006.01)
(52) U.S. Cl.
 USPC .................. 60/611; 60/600; 60/612; 123/562
(58) Field of Classification Search .................... 60/612, 60/611, 600; 123/562
See application file for complete search history.

(56) References Cited

U.S. PATENT DOCUMENTS

| 6,112,523 | A  | * | 9/2000 | Kamo et al. ..................... 60/612 |
| 2006/0059910 | A1 | * | 3/2006 | Spaeder et al. ................. 60/612 |
| 2007/0062188 | A1 |  | 3/2007 | Fry et al. |
| 2008/0077304 | A1 |  | 3/2008 | Suzuki et al. |
| 2009/0255517 | A1 |  | 10/2009 | Ishikawa et al. |
| 2009/0265080 | A1 |  | 10/2009 | Fry et al. |
| 2010/0043428 | A1 |  | 2/2010 | Stablein et al. |

FOREIGN PATENT DOCUMENTS

| CH | 215 477 | 6/1941 |
| DE | 10 2007 017 828 | 10/2008 |
| EP | 1 519 017 | 3/2005 |
| EP | 1 640 598 | 3/2006 |
| EP | 1 669 571 | 6/2006 |
| EP | 1 905 988 | 4/2008 |
| EP | 1 950 388 | 7/2008 |
| FR | 2 908 475 | 5/2008 |

(Continued)

OTHER PUBLICATIONS

International Search Report issued May 25, 2010 in International (PCT) Application No. PCT/AT2010/000033.

(Continued)

*Primary Examiner* — Mary A Davis
(74) *Attorney, Agent, or Firm* — Wenderoth, Lind & Ponack, L.L.P.

(57) ABSTRACT

An internal combustion engine is disclosed, comprising at least one first compression device and at least one second compression device which is connected in series relative to the first compression device. At least one bypass pipe bypasses at least one compression device. At least one controllable valve is arranged in the at least one bypass pipe such that the amount of fluid which can be recirculated around the compression device can be controlled.

10 Claims, 6 Drawing Sheets

FOREIGN PATENT DOCUMENTS

| | | |
|---|---|---|
| JP | 3-26826 | 2/1991 |
| WO | 2004/046519 | 6/2004 |
| WO | 2005/024201 | 3/2005 |
| WO | 2007/081342 | 7/2007 |
| WO | 2008/125571 | 10/2008 |

OTHER PUBLICATIONS

Austrian Patent Office Search Report dated Aug. 3, 2009 in Austrian Patent Application No. A 182/2009.

* cited by examiner

DUAL TURBOCHARGED INTERNAL COMBUSTION ENGINE SYSTEM WITH COMPRESSOR AND TURBINE BYPASSES

This application is a Continuation of International application No. PCT/AT2010/000033, filed Feb. 2, 2010, the entire disclosure of which is incorporated herein by reference.

BACKGROUND (1) Field of the Invention

The invention concerns a method of regulating an internal combustion engine, involving a tracking setting to an engine regulating parameter, wherein the internal combustion engine has at least one first compressor device and at least one second compressor device arranged serially in relation to the first compressor device, which compress a fluid. The invention further concerns an internal combustion engine including at least one first compressor device and at least one second compressor device arranged serially in relation to the first compressor device. In addition the invention concerns a regulating device for carrying out the method and for an aforementioned internal combustion engine.

(2) Description of Related Art

To increase power it is known in internal combustion engines for compressor devices to be connected in series in the inlet tract so that the supplied compressed gas is raised to a high pressure in two compression steps. In that case intermediate cooling is usually effected between the compressors so that a greater amount of gas can be implemented in the second compressor. To have a certain regulating reserve available, it is already known, for example from EP 1 640 598 A1, for a branch arrangement to be provided upstream of the second compressor device, the so-called high-pressure compressor, in order to take the compressed gas past the high-pressure compressor.

Although it is possible in the state of the art to quickly counter changes in load at the internal combustion engine, the period of time for tracking adjustment to the engine regulating parameter is relatively long and it is possible to observe oscillations around the reference target value.

BRIEF SUMMARY OF THE INVENTION

In view of the above, the object of the present invention is to provide a method of the general kind set forth in the opening part of this specification, in which those problems are alleviated. The invention also seeks to provide an internal combustion engine of the general kind set forth in the opening part of this specification and a regulating device which is provided for same, where those problems are alleviated.

That object is attained by a method of regulating an internal combustion engine to a substantially constant engine parameter, wherein the internal combustion engine has at least one first compressor device and at least one second compressor device arranged serially in relation to the first compressor device, which is characterised in that for tracking setting to the engine regulating parameter as a control parameter a given amount of fluid is returned around at least one of the at least two compressor devices by way of at least one bypass conduit.

In normal operation a certain compressed amount of fluid (in general compressed gas such as air or a fuel/air mixture) is continuously circulated around the compressor device, that is to say the entire compressed amount of fluid is not introduced into the combustion chamber of the internal combustion engine, but a given amount is recycled again upstream of the high-pressure compressor. When a change in load occurs, it is possible on the one hand to introduce a greater amount of compressed fluid into the combustion chamber by reducing the amount of fluid which is blown around the compressor, while on the other hand it is possible to introduce a smaller amount of compressed fluid into the combustion chamber by increasing the amount of fluid blown around the compressor. In contrast to the methods in which the compressed gas is taken past the compressor device, the method the subject-matter of this invention has the advantage that not only is the regulating reserve greater but also a tracking adjustment to the parameter to be regulated is effected more quickly.

In a preferred case it is provided that for tracking setting to the engine regulating parameter as the control parameter a given amount of fluid is returned around the at least two compressor devices by way of bypass conduits so that the regulating reserve and the level of regulating accuracy are increased.

In an internal combustion engine of the general kind set forth in the opening part of this specification that object is attained in that at least one bypass conduit passes around at least one compressor device and wherein at least one regulatable valve is arranged in the at least one bypass conduit so that the amount of fluid which can be recycled around the compressor device is regulatable, wherein at least one cooling device is arranged downstream of the at least one compressor device. The bypass conduits branch off in the direction of flow of the fluid downstream of the cooling device of the respective compressor device. The difference in density is increased by cooling of the fluid so that a larger amount of fluid can be recycled by way of the bypass conduit upstream of the compressor.

It is preferably provided in that respect that bypass conduits pass around the first compressor device and around the second compressor device and wherein regulatable valves are arranged in the bypass conduits so that the amount of fluid which can be recycled around each compressor device by means of the bypass conduits is separately regulatable. The cooling device after the respective compressor device, after which the bypass conduit branches off, leads to a greater density difference and thus permits a greater fluid recycling.

Desirably it is provided in the method that the amount of fluid returned around the first compressor device and the amount of fluid returned around the second compressor device are separately adapted. In the simplest case it can be provided that a bypass conduit passes around each compressor device.

In an embodiment it can be provided that a bypass conduit in which a regulatable valve is arranged passes around the first compressor device and a bypass conduit in which a regulatable valve is arranged passes around the second compressor device, wherein tracking setting to the engine regulating parameter is effected by regulating intervention at the at least two valves.

It can further be provided that tracking setting to the engine regulating parameter is additionally effected by regulating intervention at the throttle device. In order to still more refine the regulation action, it can finally be provided that the compressor devices are driven by an exhaust gas turbine, wherein a bypass conduit passes around at least one exhaust gas turbine, wherein for regulation to the engine regulating parameter the amount of fluid which is taken past the exhaust gas turbine is additionally regulated with a regulatable valve.

In a variant in the internal combustion engine it can be provided that the internal combustion engine is operable in at least two operating modes, wherein in the first operating mode a given amount of fluid can be recycled around each compressor device, and wherein in a second operating mode the ratio of the amount which can be recycled around the first compressor device is altered in relation to the amount which can be recycled around the second compressor device with respect to the first operating mode. In a further variant there can be provided a regulating device with which the internal combustion engine is trackingly adjusted to the engine regulating parameter, wherein for tracking setting to the engine regulating parameter in the operating mode by regulation of the regulatable valves arranged in the bypass conduits the amount of fluid which can be circulated around each compressor device can be separately altered. In the simplest case it can be provided in that respect that the first compressor device is bridged over by a bypass conduit with a regulatable valve arranged therein and the second compressor device is bridged over by a bypass conduit with a regulatable valve arranged therein. Bridging is effected in such a way that the compressor devices are bridged over in anti-parallel relationship in the flow direction, that is to say compressed fluid issuing from the compressor device is returned to the fluid inlet of the compressor device again.

In an alternative variant it can be provided that the first compressor device and the second compressor device are bridged over by a bypass conduit with two valves arranged serially therein, wherein branching off between the two valves is a conduit which opens between the two series-connected compressor devices and in which a controllable valve is arranged. Here too it is provided that the bypass conduits bridge over the compressor devices in anti-parallel relationship in the direction of flow of the compressor devices.

To improve the regulating characteristics it can further be provided that the compressor devices are driven by at least one exhaust gas turbine, wherein a bypass conduit passes around at least one exhaust gas turbine and wherein for tregulation to the engine regulating parameter in addition the amount of fluid which is taken past the exhaust gas turbine is regulated with a regulatable valve. In that case also it can be provided that there are provided two series-connected exhaust gas turbines which each drive a respective compressor device, wherein bypass conduits pass around the first exhaust gas turbine and around the second exhaust gas turbine, wherein regulatable valves are arranged in the bypass conduits so that the amount of fluid which can be taken around each exhaust gas turbine in the bypass conduits can be separately regulated. In the simplest case in that respect it can be provided that the first exhaust gas turbine is bridged over in parallel by a bypass conduit with a regulatable valve arranged therein and the second exhaust gas turbine is bridged over in parallel by a bypass conduit with a regulatable valve arranged therein. As an alternative thereto it can be provided that the first exhaust gas turbine and the second exhaust gas turbine are bridged over in parallel by a bypass conduit with two valves arranged serially therein, wherein branching off between the two valves is a conduit which opens between the two series-connected exhaust gas turbines and in which a controllable valve is arranged. In a variant it can be provided that there is provided a common regulating device for the valves.

In the preferred case the internal combustion engine is a stationary internal combustion engine of the type used, for example, in stationary power generating installations. Stationary power generating installations generally have an internal combustion engine and an electric generator for electrical power generation.

In addition the preferably stationary internal combustion engine can be a gas engine, that is to say a combustion engine which burns a gaseous fuel such as methane. Preferably this involves a mixture-charged gas engine. In mixture-charged gas engines it is not pure air but a fuel/air mixture that is compressed as the fluid in the compressor devices. For example in a variant this can involve an Otto-cycle, that is to say spark-ignition internal combustion engine.

In a variant it can be provided that the engine regulating parameter is a substantially constant engine parameter. That can be for example a constant rotary speed or a constant output power.

BRIEF DESCRIPTION OF THE DRAWINGS

Further advantages and details of the invention are described by means of the specific description and the following Figures.

DETAILED DESCRIPTION OF THE INVENTION

Figure 1:
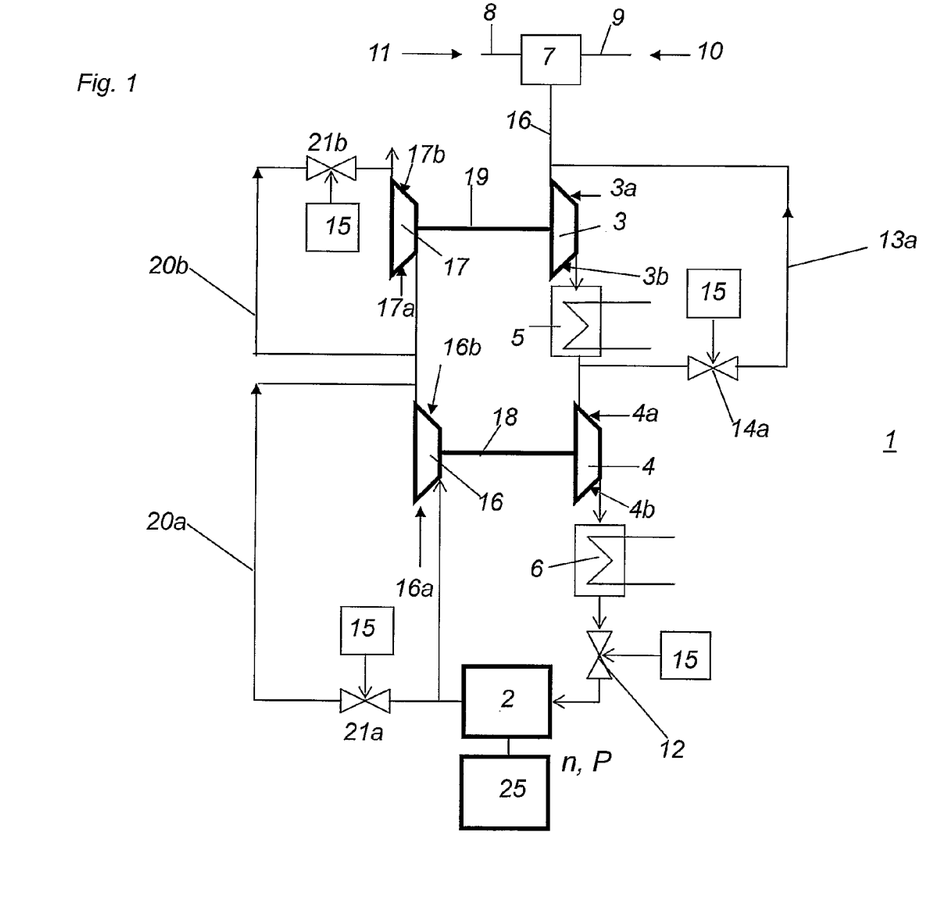
FIGS. 1 through 5 diagrammatically show five variants of internal combustion engines according to the invention.

FIG. 1 diagrammatically shows an embodiment of an internal combustion engine 1 according to the invention for carrying out the method. The internal combustion engine 1 has the actual engine 2 which is for example a gas engine. That means that gaseous fuel such as for example methane or landfill gas or biogas is burnt in the respective combustion chambers of the internal combustion engine. It is preferably provided that the internal combustion engine 2 is a stationary internal combustion engine which for example serves for power generation by means of a generator 25.

Firstly a gas mixer 7 is fed with air 10 by way of an air feed conduit 9 and a fuel gas 11, for example methane, by way of a gas feed conduit 8. Air 9 and fuel gas 11 are mixed in the gas mixer 7 to form a gas mixture and fed to the first compressor device 3 ('low-pressure compressor'). In that case the gas mixture passes by way of a fluid inlet 3a into the compressor device 4, is compressed therein and issues from the compressor device by way of a fluid outlet 3b. Then the compressed fuel-air mixture is cooled in a cooling device 5 and passed to the second compressor device 4 ('high-pressure compressor'). That is connected in series with the first compressor device 3. The gas which is pre-compressed in the first compressor device 3 is now introduced by way of the fluid inlet 4a into the compressor device 4 ('high-pressure compressor'), compressed there and issues from the compressor device 4 by way of the fluid outlet 4b. The mixture which is now highly compressed (pressures above 6 bars are possible) is then cooled by way of a further cooling device 6. The amount of gas mixture which is fed to the combustion engine 2 is now finally regulated by way of a throttle device 12, for example a throttle flap. The description hitherto applies to all five embodiments so that attention is directed to the preceding specific description for the description of FIGS. 2 through 5.

In FIG. 1 a first bypass conduit 13a in which a first valve 14a, a so-called blow-around bypass valve 14a is arranged, passes around the first compressor device 3. A certain amount of gas of the compressed gas-air mixture can be continuously blown around the compressor device 3, that is to say recycled, through the bypass conduit 13a. In specific terms therefore a part of the gas mixture compressed by the first compressor device 3 is passed from the fluid outlet 3b back to the fluid inlet 3a (by way of the cooling device or mixture cooler 5).

Figure 2:
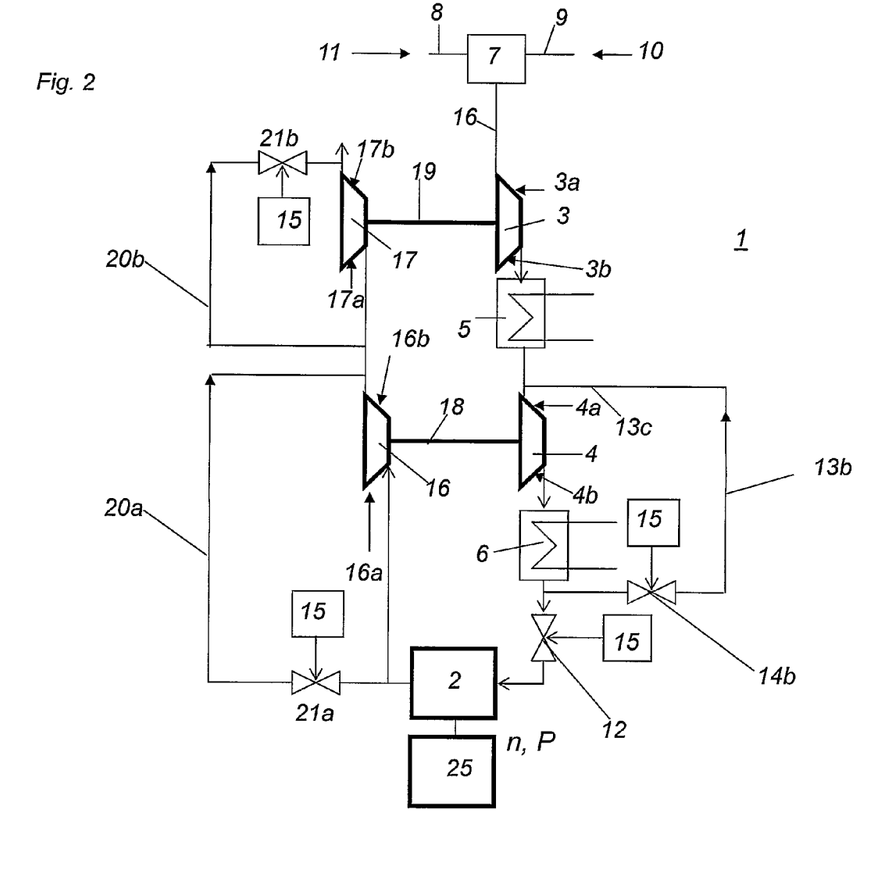

In FIG. 2 in contrast to the variant in FIG. 1 a first bypass conduit 13b in which a valve 14b, a so-called blow-around bypass valve 14b is arranged, passes not around the first but around the second compressor device 4. A certain amount of the compressed gas-air mixture can be continuously blown around the second compressor device 4, that is to say recycled, through the bypass conduit 13b. In this case therefore a part of the gas mixture compressed by the first compressor device 4 is passed from the fluid outlet 4b back to the fluid inlet 4a (by way of the cooling device or mixture cooler 6).

Figure 3A:
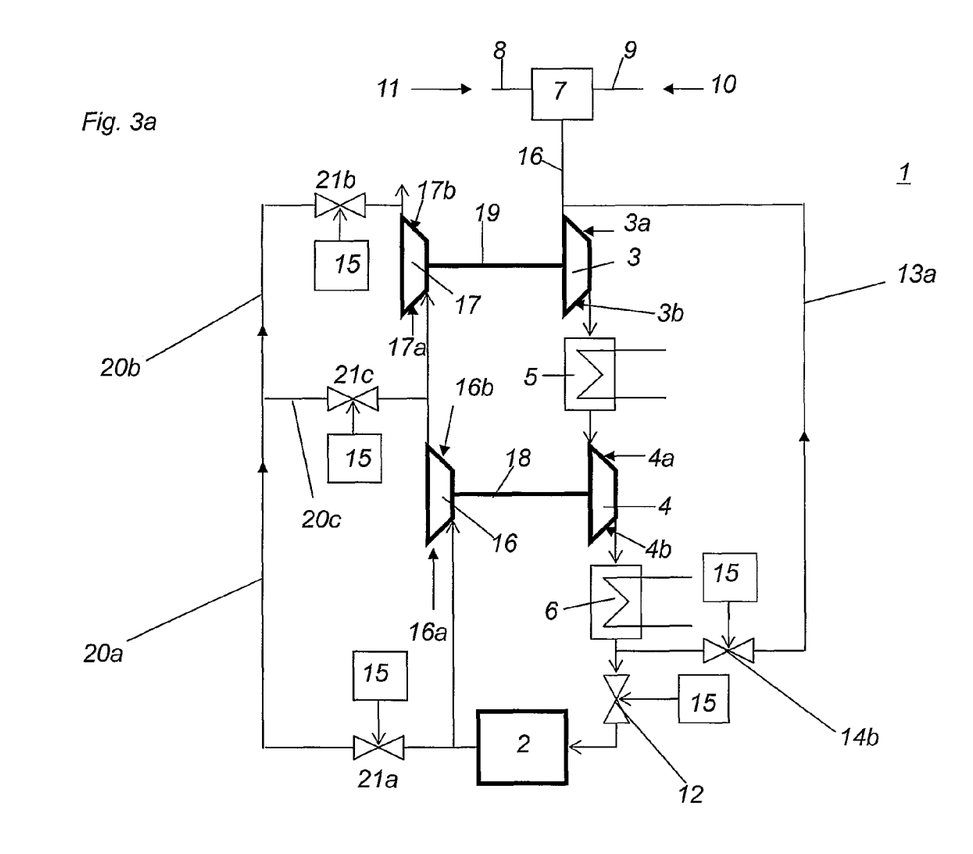
Figure 3B:
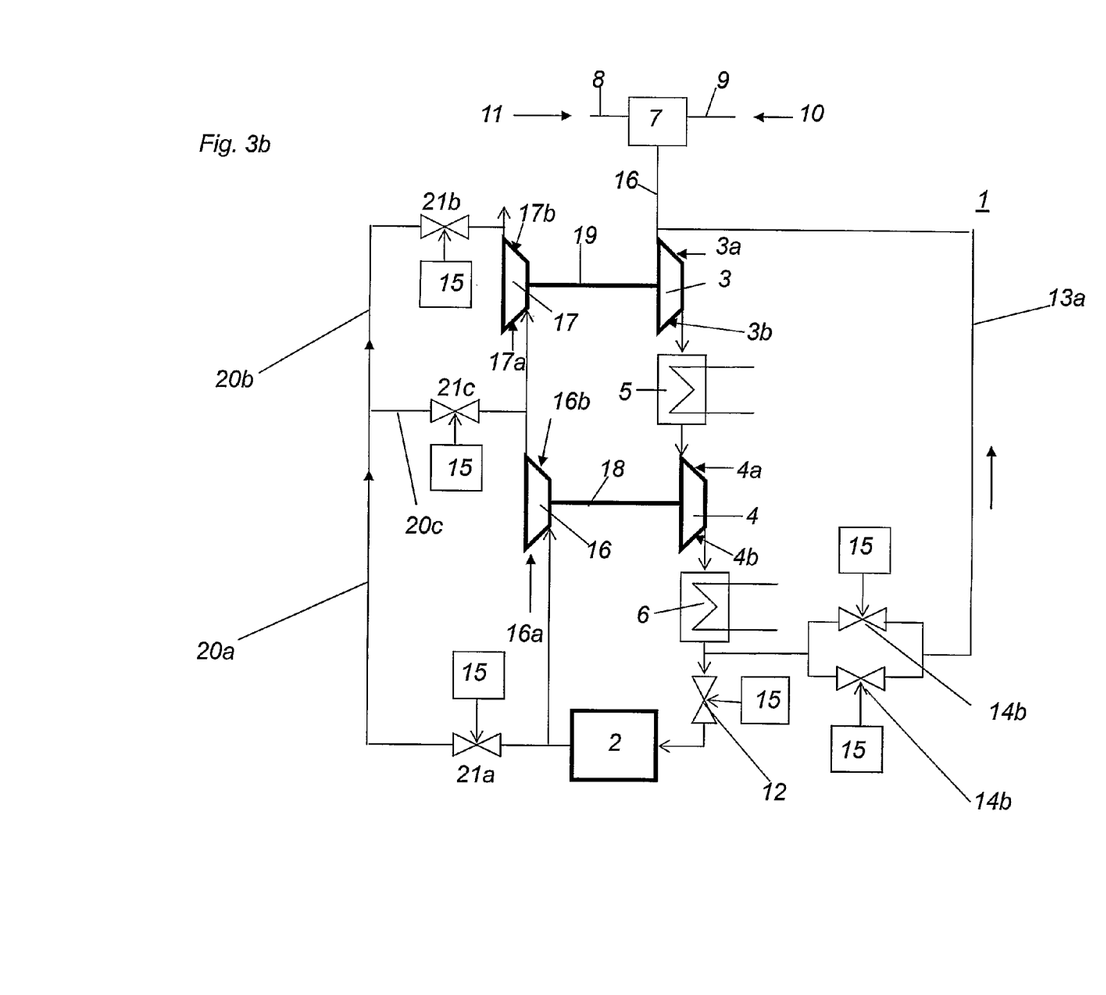

FIGS. 3a and 3b show further variants. In this case a common bypass conduit 13a in which the valve 14b, once again a so-called blow-around bypass valve 14b, is arranged passes around the first compressor device 3 and the second compressor device 4. A certain amount of the compressed gas-air mixture can be constantly blown around both compressor devices 3, 4, that is to say recycled, through the bypass conduit 13a. A part of the gas mixture compressed by the first compressor device 3 and the second compressor device 4 is passed from the fluid outlet 4b back to the fluid inlet 3a.

Figure 4:
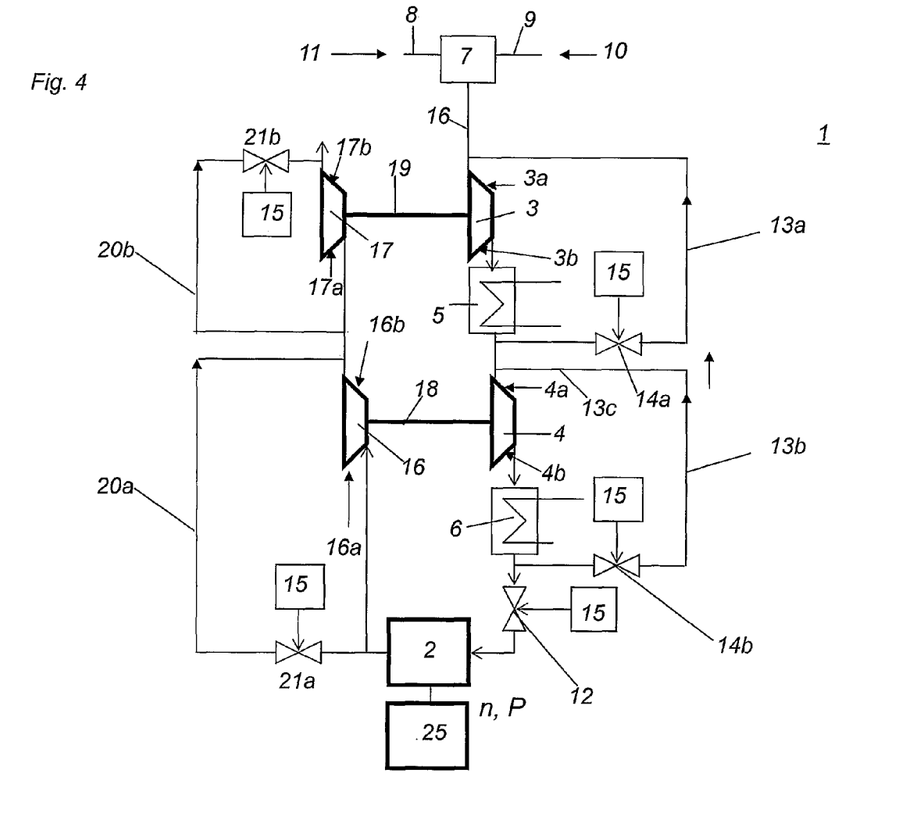

In the variant in FIG. 4 a first bypass conduit 13a in which a first valve 14a, a so-called blow-around bypass valve 14a, is arranged passes around the first compressor device 3. A second bypass conduit 13b with a second blow-around valve 14b passes around the second compressor device 4. Therefore a certain amount of the compressed gas-air mixture can be continuously blown around the respective compressor device 3, 4, that is to say recycled, through the bypass conduits 13a, 13b. In specific terms therefore a part of the gas mixture compressed by the first compressor device 3 is passed from the fluid outlet 3b back to the fluid inlet 3a (by way of the mixture cooler 5). In addition a part of the gas mixture compressed by the second compressor device 4 is passed from the fluid outlet 4b back to the fluid inlet 4a (by way of the mixture cooler 6).

Figure 5:
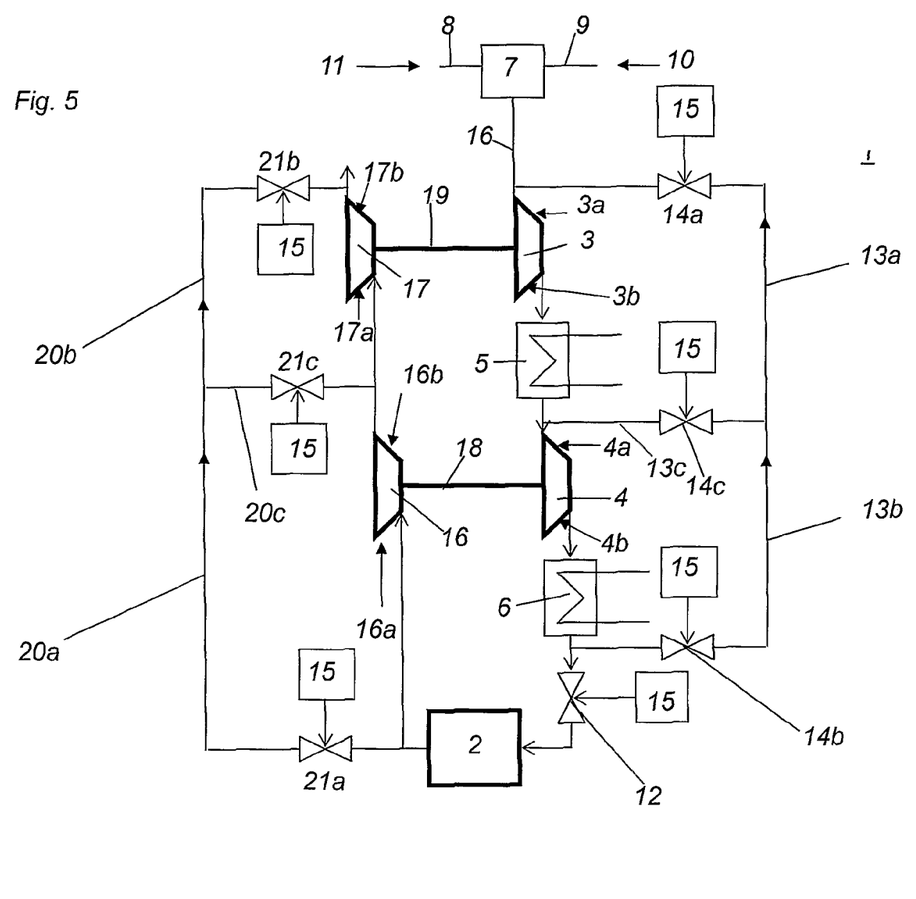

While FIG. 4 shows two serial compressor devices 3, 4, around which a respective bypass conduit 13a and 13b is passed (more specifically in an anti-parallel flow direction as can be seen from the flow arrows), each with a respective valve 14a, 14b, FIG. 5 shows a variant in which two series-connected valves 14a, 14b are provided around the series-connected compressor devices 3, 4. In the bypass conduit 13a, 13b there is a branching between the two valves 14a, 14b by way of the conduit 13c which opens in the inlet tract between the two compressor devices 3, 4.

The most essential difference in comparison with the FIG. 4 embodiment is that in the example in FIG. 5, it is possible to provide that the compressed fluid is blown around or recycled directly from the fluid outlet side 4b of the second compressor 4 in the direction of the fluid inlet 3a of the first compressor device 3. In that case recycle blowing can be effected by way of both compressor devices or only by way of one by suitable actuation of the individual valves 14a, 14b and 14c. As the other components are identical to the embodiment of the preceding Figures there is no need for them also to be discussed in greater detail here.

What is common to the illustrated embodiments in FIGS. 1 through 5 is that the valves 14a, 14b, 14c (insofar as they are present) in the respective bypass conduit 13a, 13b, 13c (also insofar as present) are now connected to a regulator 15 of a regulating device. For the sake of clarity of the drawing an individual regulator 15 is shown in relation to each valve 14a, 14b, 14c, the regulators jointly forming a regulating device.

The operating mode will be described in greater detail with reference to FIG. 4. As already mentioned air 9 and fuel gas 8 are mixed in the gas mixer 7, compressed in the low-pressure compressor 3 and then cooled in the gas mixture cooler 5. A part of the mixture is blown around by way of the bypass conduit 13a, that is to say returned to the fluid inlet 3a, while another part of the mixture is passed into the high-pressure compressor 4. It is further compressed in the high-pressure compressor 4 and then cooled in the cooler 6 and a part of the mixture is by-passed with the bypass conduit 13b and recycled between the two compressor devices 3, 4 at the fluid inlet 4a of the second compressor device. The remaining part of the mixture is introduced into the combustion chamber of the internal combustion engine 2. Final quantitative regulation of the mixture feed can be implemented by way of the throttle flap 12.

Under modified conditions on the engine such as for example a change in load the supplied amount of fuel can now be adapted without further ado by way of a regulating intervention at the valves 14a and 14b in order to provide for regulation to a given engine regulating parameter (such as for example a constant engine parameter, for example a constant rotary speed n or a constant output power P). Upon very great changes in loads both valves 14a and 14b are actuated so that the amount of fluid which is bypassed or recycled around both compressor devices 3, 4 is altered. With less severe changes in load it is generally sufficient to actuate only one valve 14a, 14b. Fluctuations can be particularly advantageously avoided by way of actuation of the valve 14a as here the bypassed amount is less so that the internal combustion engine 2 receives a feed of a larger or smaller amount of compressed gas more slowly. In comparison the valve 14b can react better to very fast changes in load. Individual regulation can be effected by way of the throttle flap 12 just like by way of regulation of the rotary speed of the compressor device 3, 4 insofar as an alteration is made at the exhaust gas turbine 16 or 17. For that purpose a certain amount of exhaust gas can be continuously circulated in operation by way of the bypass conduits 20a and 20b respectively. Here too upon changes in load it is possible by actuation of the valves 21a and 21b to make changes to the engine such as for example an altered load or an altered rotary speed by bypassing more or less mixture around the compressor devices 16, 17.

Regulation of the examples in FIGS. 1 and 2 is effected in corresponding fashion in simplified form by regulating only the amount of mixture that is blown around a compressor device 3 (FIG. 1) or 4 (FIG. 2). Regulation can otherwise be effected in a similar manner. A similar consideration applies to the variants in FIGS. 3a and 3b in which the mixture is passed around both compressor devices 3, 4 but no branching is provided therebetween so that only the fluid outlet 4b is ever connected to the fluid inlet 3a. The embodiments of FIGS. 3a and 3b are preferred embodiments of the invention. The difference between the examples of FIGS. 3a and 3b is that FIG. 3a has a bypass conduit in which a regulator 15 regulates a valve 14b while in the example of FIG. 3b two valves 14b, 14b' arranged in parallel are provided in the one bypass conduit 13a. In that case a valve 14b is regulated in the example in FIG. 3a by way of the regulator 15. The second valve 14b' is operated in the adjusting mode, that is to say it is to be operated only in the position open, and not continuously like the valve 14b. That permits faster intervention upon changes in load on the internal combustion engine.

Regulation can also be effected for example in such a way that in the operating mode a given amount of gas is continuously blown around both compressor devices (see for example FIG. 5), by for example the valves 14a and 24b being opened while the valve 14c is closed. Now for regulation purposes one of the two valves 14a, 14b can be closed and the valve 14c opened. Either the valve 14a or 14b is closed in dependence on the difference between the reference value and the actual value. The example of FIG. 5 is particularly suitable as here the regulating strategies of the variants of FIGS. 1, 2 and 3 can be additionally implemented.

Hitherto only the inlet tract has been described. Hereinafter the outlet tract will also be briefly described, and the regulating strategies arising therefrom explained. As can be seen from FIGS. 1 through 5 the compressor devices 3, 4 are so-called turbochargers. They are driven by an exhaust gas turbine 16 and 17 respectively by exhaust gas from the internal combustion engine 2 entering at the fluid inlet 16a of the exhaust gas turbine 16, rotating the turbine 16 and issuing at the fluid outlet 16b again. The turbine 16 which now rotates drives the high-pressure compressor 4 by way of the shaft 18. The exhaust gas is now passed to the series-connected second exhaust gas turbine 17 where the exhaust gas fluid enters the exhaust gas turbine 17 at the fluid inlet 17a and is definitively expelled at the fluid outlet 17b.

A bypass conduit 20a having a valve 21a now passes around the exhaust gas turbine 16. A further bypass conduit 20b having a valve 21b passes around the compressor device 17. The amount of exhaust gas which is passed around the exhaust gas turbine 16 and 17 respectively can be regulated by way of the two valves 21a, 21b (similarly to the bypass valves 14a, 14b). They are also connected to the regulating device by way of regulators 15 (FIGS. 1, 2 and 4).

In the embodiments of FIGS. 3a and 3b and 5 the arrangement of the valves 21a and 21b in the exhaust gas tract is modified and there is an additional valve 21c insofar therefore as the valves 21a and 21b are connected in series and a branching 20c is taken off between them, which opens between the two exhaust gas turbines 16, 17.

In addition to regulation by way of the inlet tract, it is also possible to provide for regulation by way of the outlet tract, by way of suitable regulating interventions at the valves 21a, 21b, 21c. A combination of the individual inlet tract variants of FIGS. 1, 2 and 4 with the outlet tracts of FIGS. 3 and 5 and the inlet tract variants of FIGS. 3 and 5 with the outlet tracts of FIGS. 1, 2 and 4 is obviously also provided in accordance with the invention and no longer needs to be discussed in detail here.

The invention claimed is:

1. An internal combustion engine comprising:
a first compressor device for compressing a fuel;
a second compressor device downstream of the first compressor device for compressing the fuel;
a cooling device downstream of the first compressor device for cooling the compressed fuel;
an engine for combusting the fuel, the engine being disposed downstream of the second compressor device;
a first bypass which conveys the fuel from an outlet side of the second compressor device to an inlet side of the first compressor device, the first bypass conduit having an inlet downstream of the second compressor device and upstream of the engine;
a first fuel valve disposed on the first bypass conduit;
a second bypass conduit having an inlet between the first compressor device and the second compressor device and conveying the fuel to the first bypass conduit; and
a second fuel valve disposed on the second bypass conduit, wherein an amount of fuel which is recycled around both the first and second compressor devices before reaching the engine is regulated by the first fuel valve, and an amount of fuel which is recycled around the first compressor device before reaching the second compressor device is separately regulated by the second fuel valve.

2. The internal combustion engine of claim 1, further comprising a third fuel valve disposed on the first bypass conduit downstream of the first fuel valve and the second fuel valve.

3. The internal combustion engine of claim 1, further comprising:
a first exhaust gas turbine driving the first compressor device;
a second exhaust gas turbine arranged in series with the first exhaust gas turbine and driving the second compressor device, the second exhaust gas turbine being disposed upstream of the first exhaust gas turbine and downstream of the engine;
a third bypass conduit which conveys exhaust gas from the engine to bypass the first exhaust gas turbine and the second exhaust gas turbine, the third bypass conduit having an inlet downstream of the engine and upstream of the second exhaust gas turbine;
a first exhaust valve disposed on the third bypass conduit;
a fourth bypass conduit having an inlet between the second exhaust gas turbine and the first exhaust gas turbine and conveying the exhaust to the third bypass conduit; and
a second exhaust valve disposed on the fourth bypass conduit,
wherein an amount of exhaust which bypasses both the first and second exhaust gas turbines is regulated by the first exhaust valve, and an amount of exhaust which bypasses the first exhaust gas turbine after passing through the second exhaust gas turbine is regulated by the second exhaust valve.

4. The internal combustion engine of claim 3, further comprising a third exhaust valve disposed on the third bypass conduit downstream of the first exhaust valve and the second exhaust valve.

5. A method comprising:
providing the internal combustion engine of claim 1; and
controlling the first fuel valve and the second fuel valve to maintain a constant rotary speed of the engine.

6. A method comprising:
providing the internal combustion engine of claim 1; and
controlling the first fuel valve and the second fuel valve to maintain a constant power output of the engine.

7. An internal combustion engine comprising:
a first compressor device for compressing a fuel;
a second compressor device downstream of the first compressor device for compressing the fuel;
a cooling device downstream of the first compressor device for cooling the compressed fuel;
an engine for combusting the fuel, the engine being disposed downstream of the second compressor device;
a first exhaust gas turbine driving the first compressor device;
a second exhaust gas turbine arranged in series with the first exhaust gas turbine and driving the second compressor device, the second exhaust gas turbine being disposed upstream of the first exhaust gas turbine and downstream of the engine;
a first bypass conduit having an inlet downstream of the second compressor device;
a second bypass conduit having an inlet downstream of the first compressor device and upstream of the second compressor device;
a third bypass conduit which conveys exhaust gas from the engine to bypass the first exhaust gas turbine and the second exhaust gas turbine, the third bypass conduit having an inlet downstream of the engine and upstream of the second exhaust gas turbine;
a first exhaust valve disposed on the third bypass conduit;
a fourth bypass conduit having an inlet between the second exhaust gas turbine and the first exhaust gas turbine and conveying the exhaust to the third bypass conduit; and
a second exhaust valve disposed on the fourth bypass conduit, wherein an amount of exhaust which bypasses both the first and second exhaust gas turbines is regulated by the first exhaust valve, and an amount of exhaust which bypasses the first exhaust gas turbine after passing through the second exhaust gas turbine is regulated by the second exhaust valve.

8. The internal combustion engine of claim 7, further comprising a third exhaust valve disposed on the third bypass conduit downstream of the first exhaust valve and the second exhaust valve.

9. A method comprising:
providing the internal combustion engine of claim 7; and
controlling the first exhaust valve and the second exhaust valve to maintain a constant rotary speed of the engine.

10. A method comprising:
providing the internal combustion engine of claim 7; and
controlling the first exhaust valve and the second exhaust valve to maintain a constant power output of the engine.

* * * * *